(12) United States Patent
Ueno et al.

(10) Patent No.: US 6,338,499 B2
(45) Date of Patent: *Jan. 15, 2002

(54) CAR INTERIOR PART WITH AIR BAG COVER PORTION

(75) Inventors: Shigehiro Ueno, Kasugai; Akiyoshi Nagano, Ama-gun; Yuji Kuriyama, Seki; Kazumasa Suzuki, Ogaki; Hikaru Ando, Kasugai, all of (JP)

(73) Assignee: Toyoda Gosei Co., Ltd., Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,324

(22) Filed: Dec. 21, 1999

(30) Foreign Application Priority Data

Dec. 21, 1998 (JP) ............................................. 10-363439
Sep. 30, 1999 (JP) ............................................. 11-277704

(51) Int. Cl.[7] ................................................. B60R 21/22
(52) U.S. Cl. .................. 280/732; 280/728.2; 280/728.3
(58) Field of Search ............................. 280/728.3, 732, 280/728.2, 728.1

(56) References Cited

U.S. PATENT DOCUMENTS 5,564,731 A * 10/1996 Gallgher et al. ......... 280/728.3
5,662,351 A * 9/1997 Phillion et al. .......... 280/728.3
5,738,366 A * 4/1998 Phillion ................... 280/728.3
5,865,461 A * 2/1999 Totani et al. ............. 280/728.3

FOREIGN PATENT DOCUMENTS

| EP | 0748722 A2 | 12/1996 |
| JP | 9-156444 | 6/1997 |
| WO | WO 98/54033 | 12/1998 |

* cited by examiner

Primary Examiner—Eric Culbreth
(74) Attorney, Agent, or Firm—Pillsbury Winthrop LLP Intellectual Property

(57) ABSTRACT

A car interior part, to which an air bag device can be assembled, includes an interior part main body portion and a cover portion for an air bag. In the periphery of the back surface of the cover portion, there is formed an angular shaped mounting wall which can be connected to the air bag device. The mold releasing direction of the interior part main body portion is set as a direction that crosses the developing direction of an air bag. At least one of front and rear mounting walls formed in the mounting wall is or are formed in the same direction as the mold releasing direction of the interior part main body portion. In the portion of the rear mounting wall that is situated upwardly of the mounting portion of the rear mounting wall, there is formed an integral hinge portion. The mounting portion of the rear mounting wall is fixed to the air bag device while it is folded at the integral hinge portion thereof.

5 Claims, 4 Drawing Sheets

CAR INTERIOR PART WITH AIR BAG COVER PORTION

BACKGROUND OF THE INVENTION

1. Field of the Invention

The present invention relates to a car interior part with an air bag cover portion such as an instrument panel, a door trim, a seat back or the like to which an air bag device is to be connected.

The present application is based on Japanese Patent Applications No. Hei. 10-363439 and 11-277704, which are incorporated herein by reference.

2. Description of the Related Art

In this specification, description will be given below mainly of an instrument panel but, of course, the invention is not limited to the instrument panel.

Also, in this specification, the front and rear as well as the right and left of a car interior part (instrument panel), unless otherwise specified, respectively correspond to the front and rear as well as the right and left of a car when the car interior part (instrument panel) is actually mounted in the car.

As a car interior part of this type, for example, in the case of an instrument panel 112 which has such a basic curved section as shown in FIG. 1, there is provided the following structure.

That is, the instrument panel 112 comprises a main body portion 114 and a cover portion 116 for connection to an air bag device, while the main body portion 114 and cover portion 116 are formed in an integrally united body in such a manner that the surface sides thereof are substantially flush with each other and, in the periphery of the back surface of the cover portion 116, there are provided two angular-shaped mounting walls 118a and 118b which can be connected to an air bag device. Reference character 120 designates a design seat which is insert molded for enhancement of the design of the instrument panel 112.

Now, the present instrument panel 112 is molded using a metal mold which, as shown in FIG. 1, is composed of a movable mold 122 and a fixed mold 124. And, the metal mold is opened in a direction intersecting at right angles to the maximum bulged portion of the curved section of the main body portion 114 in order not to produce any undercut in the curved section of the main body portion 114. As a result, the front and rear mounting walls 118a and 118b, which are formed so as to be substantially upright with respect to the upper surface of the instrument panel 112, produce an undercut which crosses a mold releasing direction (shown by an arrow mark in FIG. 1).

This makes it necessary to provide a first slide core 126 and a second slide core 128 in the releasing direction of the front and rear mounting walls 118a and 118b, with the result that the structure of the metal mold is complicated.

To solve this problem, as disclosed in Japanese Patent Publication No. Hei. 9-156444, there can be employed a structure in which, out of the front and rear mounting walls 118a and 118b, one mounting wall (rear mounting wall) is formed in the same direction as the mold releasing direction. However, in this structure, as set forth in the above-cited publication, it is necessary to provide, in an air bag device (air bag case), a mounting bracket (mounting member) which projects in a direction parallel to the mounting end portion of the rear mounting wall, that is, in the mold removing direction.

SUMMARY OF THE INVENTION

The present invention aims at eliminating the drawbacks found in the above-mentioned conventional car interior part with an air bag cover portion. Accordingly, it is an object of the invention to provide a car interior part with an air bag cover portion which not only can simplify the structure of a metal mold but also eliminates the need to provide in an air bag device a mounting member that projects in a mold releasing direction.

The present inventors have carefully studied the structure of the conventional car interior part for connection of an air bag device thereto and have found that, in order to solve the above-mentioned problems found in the conventional car interior part, at least one of the front and rear mounting walls of the mounting wall may be formed in the same direction as the mold releasing direction of the main body portion of the car interior part, and there may be formed an integral hinge portion in the portion of the mounting wall that is situated upwardly of the mounting portion of the mounting wall, whereby the mounting portion of the mounting wall can be mounted onto the air bag device while it is folded at the integral hinge portion thereof. Thus, the present inventors have successfully developed a car interior part with an air bag cover portion which has the following structure.

That is, according to the present invention, there is provided a car interior part designed for connection of an air bag device thereto. The car interior part comprises: a main body portion; a cover portion formed in the main body portion to thereby cover an air bag device; and a mounting wall formed in at least a part of a periphery of a back surface of the cover portion, to which the air bag device is connected. A mold releasing direction of the main body portion is set in a direction to cross a developing direction of an air bag of the air bag device. The mounting wall includes a front mounting wall and a rear mounting wall, and at least one of the front and rear mounting walls is formed so as to be extend in the same direction as the mold releasing direction of the main body portion. Further, at least one of the front and rear mounting walls has an integral hinge portion situated at a position upward of a mounting portion to which the air bag device is fixed while one of the front and rear mounting walls is folded at the integral hinge portion.

Preferably, the main body portion and the cover portion are integrally molded so that their respective surfaces sides are substantially flush with each other.

Further, the rear mounting wall has the integral hinge portion, and the car interior part further includes a plurality of reinforcing ribs, being disposed in parallel to the mold releasing direction of the main body portion. Preferably, a front end edge of each of the reinforcing ribs extends from the position of the integral hinge portion of the rear mounting wall in parallel to the front mounting wall.

Thanks to the above-mentioned structure, the car interior part with an air bag cover portion according to the invention can provide the following operation and effects.

That is, since at least one of the front and rear mounting walls is or are formed in the same direction as the mold releasing direction of the car interior part main body portion, there is eliminated the need for provision of one or both of the two slide cores that have been conventionally disposed on the mold releasing side of the rear mounting wall, which not only can simplify the structure of the metal mold but also can eliminate the need to provide an extra mounting member such as a mounting bracket or the like in the air bag device.

By the way, when the rear mounting wall is formed in the same direction as the mold releasing direction of the car interior part main body portion, since the rear mounting wall is reinforced by the reinforcing ribs, there is no possibility that there can arise a problem as to the strength of the rear mounting wall; and, if the surfaces of the respective reinforcing ribs including the rear ends thereof are formed so as to extend in parallel to the front mounting wall, then there is no fear that, when the air bag device is actuated, the air bag can get into a gap formed between the rear mounting wall and the back surface of the cover portion, which makes it possible to stabilize the developing property (inflatability) of the air bag.

Accordingly, it is possible to provide a car interior part with an air bag cover portion which-can be molded by a metal mold having a simple structure, which in turn can enhance the productivity of the car interior part.

Features and advantages of the invention will be evident from the following detailed description of the preferred embodiments described in conjunction with the attached drawings.

DETAILED DESCRIPTION OF THE PREFERRED EMBODIMENTS

Figure 1:
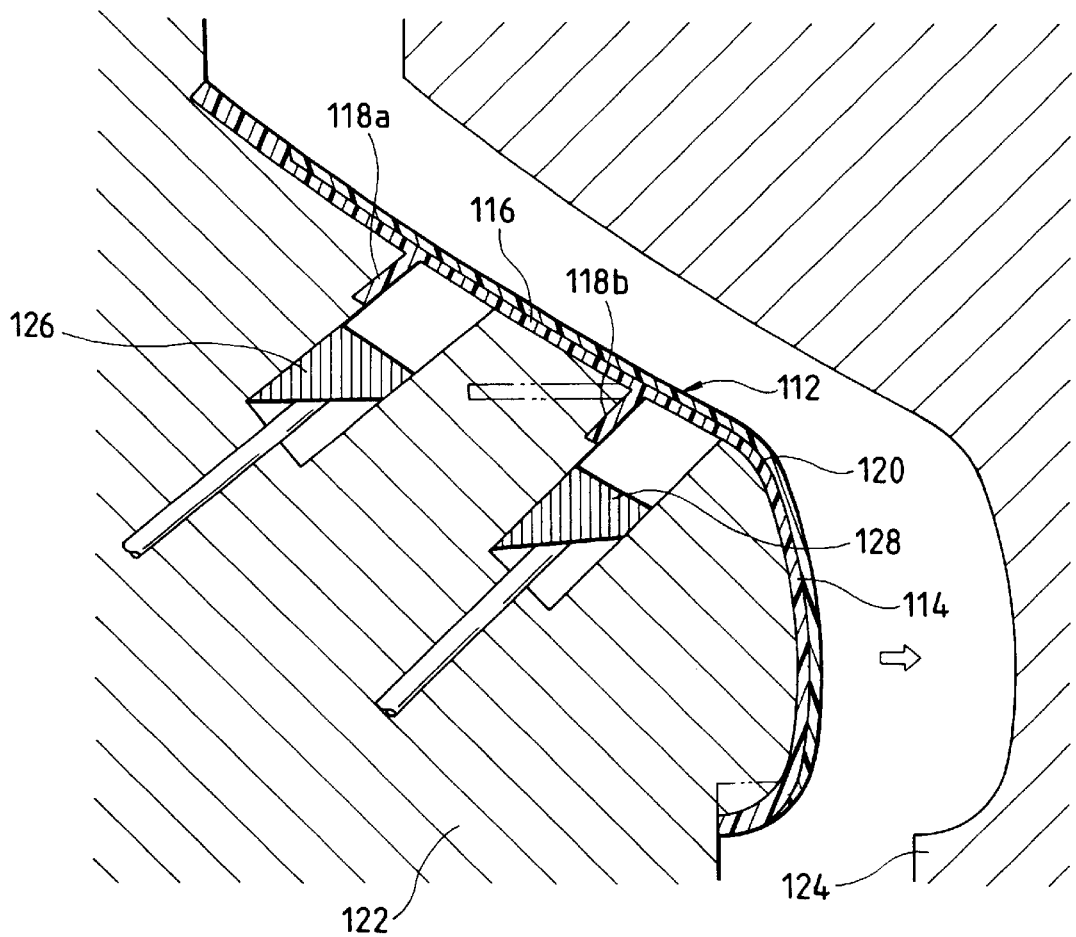
FIG. 1 is a schematic section view of a metal mold, showing a method of manufacturing a conventional instrument panel.
Figure 2:
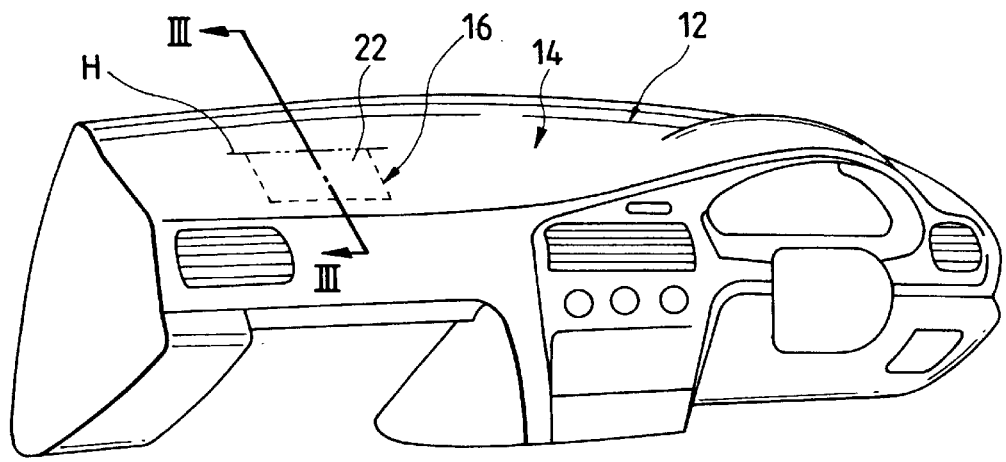
FIG. 2 is a perspective view of an instrument panel according to the invention, showing how it is assembled.
Figure 3:
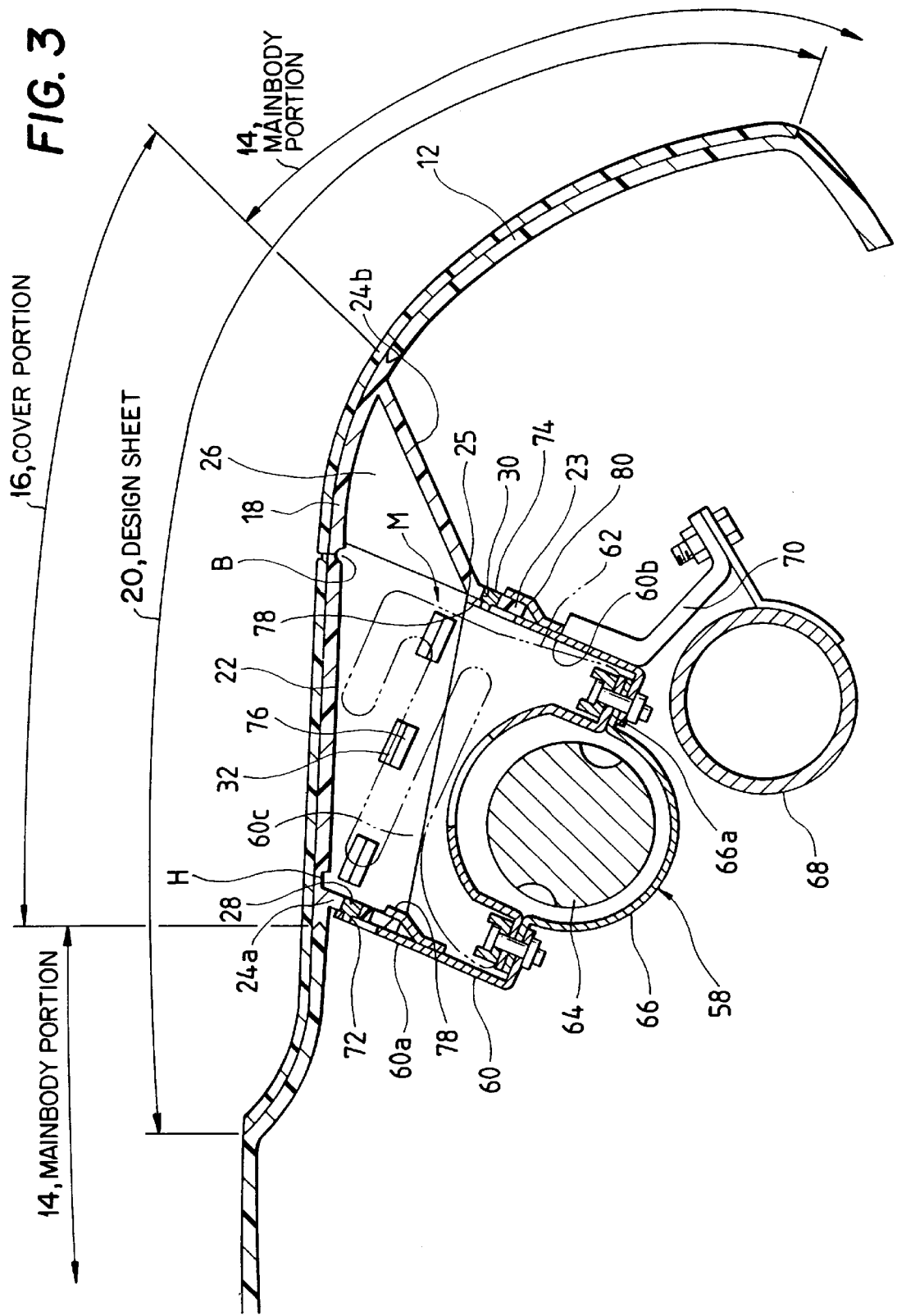
FIG. 3 is a section view of a portion, taken along the line III—III shown in FIG. 2.
Figure 4:
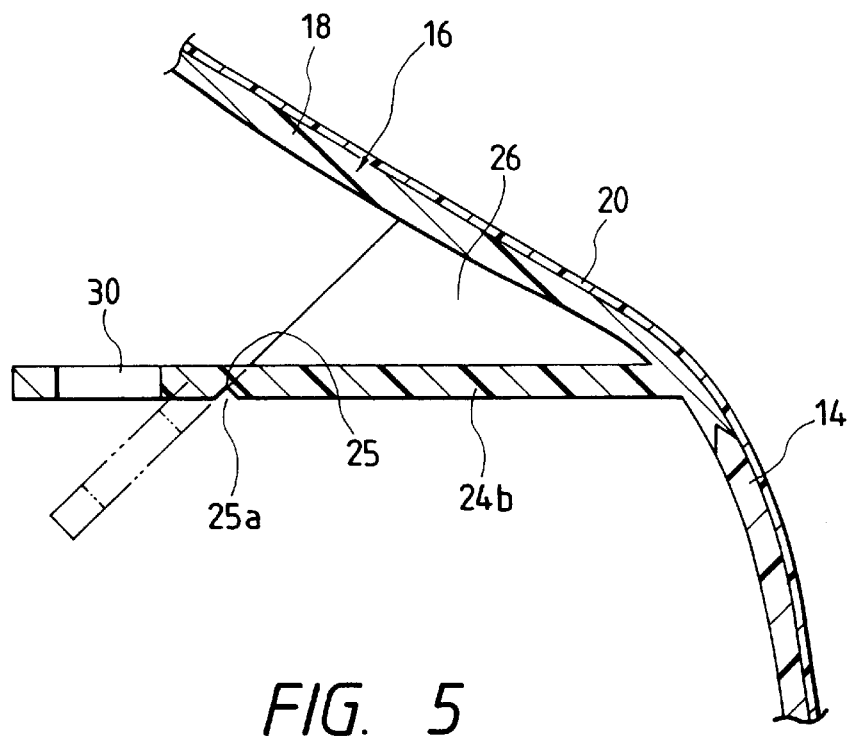
FIG. 4 is an enlarged section view of a rear mounting wall portion of a molding of the instrument panel shown in FIG. 3.

Now, description will be given below of an embodiment of a car interior part with an air bag cover portion. More particularly, an instrument panel as an example of the present car interior part with an air bag cover portion. In the present embodiment, the same parts thereof is used as in the above-mentioned conventional instrument panel are given the same designations.

(1) An instrument panel 12 according to the invention is structured as shown in FIGS. 2 to 5.

That is, the present instrument panel 12 comprises a main body portion 14 and a cover portion 16. In order to be able to form an opening through which an air bag can develop when an air bag device is operated, the cover portion 16 includes a door portion 22 which is defined by a breaking fragile portion B and a hinge portion H. In the periphery of the back surface of the cover portion 16, there is formed an angular-shaped mounting wall 24 which is to be connected to the air bag device. The instrument panel 12 is also structured such that the basic cross section thereof shows a curved shape and the mold releasing direction thereof is a direction which crosses the developing direction of the air bag. And, although not always necessary, in the illustrated embodiment, the main body portion 14 and cover portion 16 are formed in an integrally united body in such a manner that their respective right surfaces sides are flush with each other.

Here, the main body portion 14 and cover portion 16 may be formed of the same material but, in the present embodiment, they are formed of two different kinds of material which are easy to meet their respective required characteristics (two-layer molding).

That is, the cover portion 16 requires flexibility and given tensile strength in order to secure a hinge characteristic and thus it is normally formed of thermoplastic elastomer (TPE) such as olefin thermoplastic elastomer or the like which is light in weight and highly resistant to the weather and shows a tensile breaking stress of 5–50 MPa (preferably, 5–10 MPa). On the other hand, the main body portion 14 is formed of plastic material combined with reinforcing filler such as fiber-reinforced PP (polypropylene) or the like which shows a bending elastic modulus of 2000 MPa or more in order to secure shape holdability and high temperature resistance.

By the way, when the main body portion 14 and cover portion 16 are formed of the same material, they are formed of the above-mentioned olefin thermoplastic elastomer that shows a tensile breaking stress of 600–800 MPa.

(2) In the instrument panel 12 to which the present embodiment of the invention is applied, out of the front and rear mounting walls 24a and 24b of the mounting wall 24, the rear mounting wall 24b is formed as an inclined wall. This inclined wall is inclined in the same direction as the mold releasing direction of the instrument panel 12. In the portion of the rear mounting wall 24b that is situated upwardly of a mounting portion 23 for the rear mounting wall 24b, there is formed an integral hinge portion 25, so that the mounting portion 23 of the mounting wall 24b can be fixed to an air bag device 58. In other words, the mounting wall 24b can be fixed to an air bag case 60 while the mounting portion 23 is folded at the integral hinge portion 25. The integral hinge portion 25 is formed of a strip groove 25a. In the illustrated embodiment, the strip groove 25a for forming the integral hinge portion 25 is formed on the outside of the rear mounting wall 24b but such strip groove 25a may also be formed on the inside, or, on both of the inside and outside of the rear mounting wall 24b. Also, the section shape of the strip groove 25a, in the illustrated embodiment, is a triangle but it can take any other shape, for example, it can take a U shape, a semicircular shape, a trapezoidal shape or the like. The depth of the strip groove 25a, while it depends on the quality of the groove forming material and the thickness of the rear mounting wall 24b, may be a depth which allows the strip groove 25a to be folded at the present position or at the hinge portion 25 forming position (which may also contain the linear elastic return property of the strip groove 25a at the present position); and, when the cover portion forming material is olefin TPE, normally, the depth may be in the range of 0.5–1.5 mm. If the depth is in this range, a molding can be forcibly removed or released from the metal mold.

Also, the front mounting wall 24a, similarly to the rear mounting wall 24b, may be formed as an inclined wall which is inclined in the same direction as the mold releasing direction of the instrument panel 12. On the upper side of the mounting portion also at the front mounting wall 24a to which the air bag device is fixed, there may be formed an integral hinge portion. Additionally, the two right and left mounting walls 24c and 24c of the mounting wall 24 are respectively formed as vertical walls.

In the above description, the integral hinge portion 25 is formed of the strip groove 25a but, if there occurs a fold too easily in the present portion, then the invention is not limited to the above structure but there can be employed any other structure. For example, the lower portion of the mounting wall 23 than the integral hinge portion 25 may be formed thin, or a reinforcing rib may be formed down to the integral hinge portion 25 from above.

Figure 5:
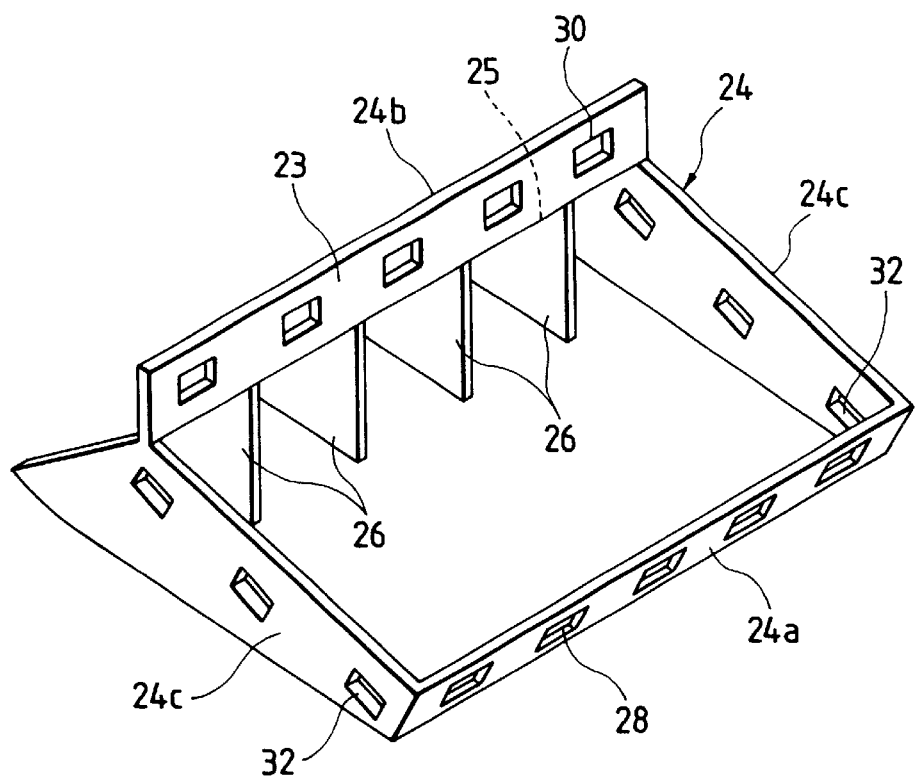
FIG. 5 is a perspective view of the lower surface of only the mounting wall in the cover portion of the instrument panel.

Also, in preparation for a case in which it is difficult for the rear mounting wall 24b to obtain a sufficient strength, and from the viewpoint of guiding the air bag developing direction, there are formed a plurality of reinforcing ribs 26 each having a triangular-shaped plane, the front end edges of which respectively extend from the position of the integral hinge portion 25 of the rear mounting wall 24b in parallel to the front mounting wall 24a, in such a manner that they are disposed in parallel to the mold releasing direction of the instrument main body portion (car interior part main body portion) 14 (see FIG. 5).

(3) Although not always necessary, from the viewpoint of enhancement in the design of the instrument panel 12, there is insert molded a design surface forming sheet (which is hereinafter abbreviated to a design sheet) 20 which forms a surface layer extending from the cover portion 16 to the main body portion 14. The physical structure (not shown) of the design sheet 20, normally, is composed of three layers, that is, a skin layer disposed on the surface side and formed of soft vinyl chloride or olefin TPE which is good to the touch, a cushion layer disposed on the back surface side of the skin layer and formed of foam polypropylene or the like, and a barrier layer disposed on the back surface side of the cushion layer and formed of styrene-system TPE or olefin-system TPE. However, the design sheet 20 may also be composed of two layers, that is, the skin layer and cushion layer; or, it may also be formed of a single layer, that is, only the skin layer.

Figure 6:
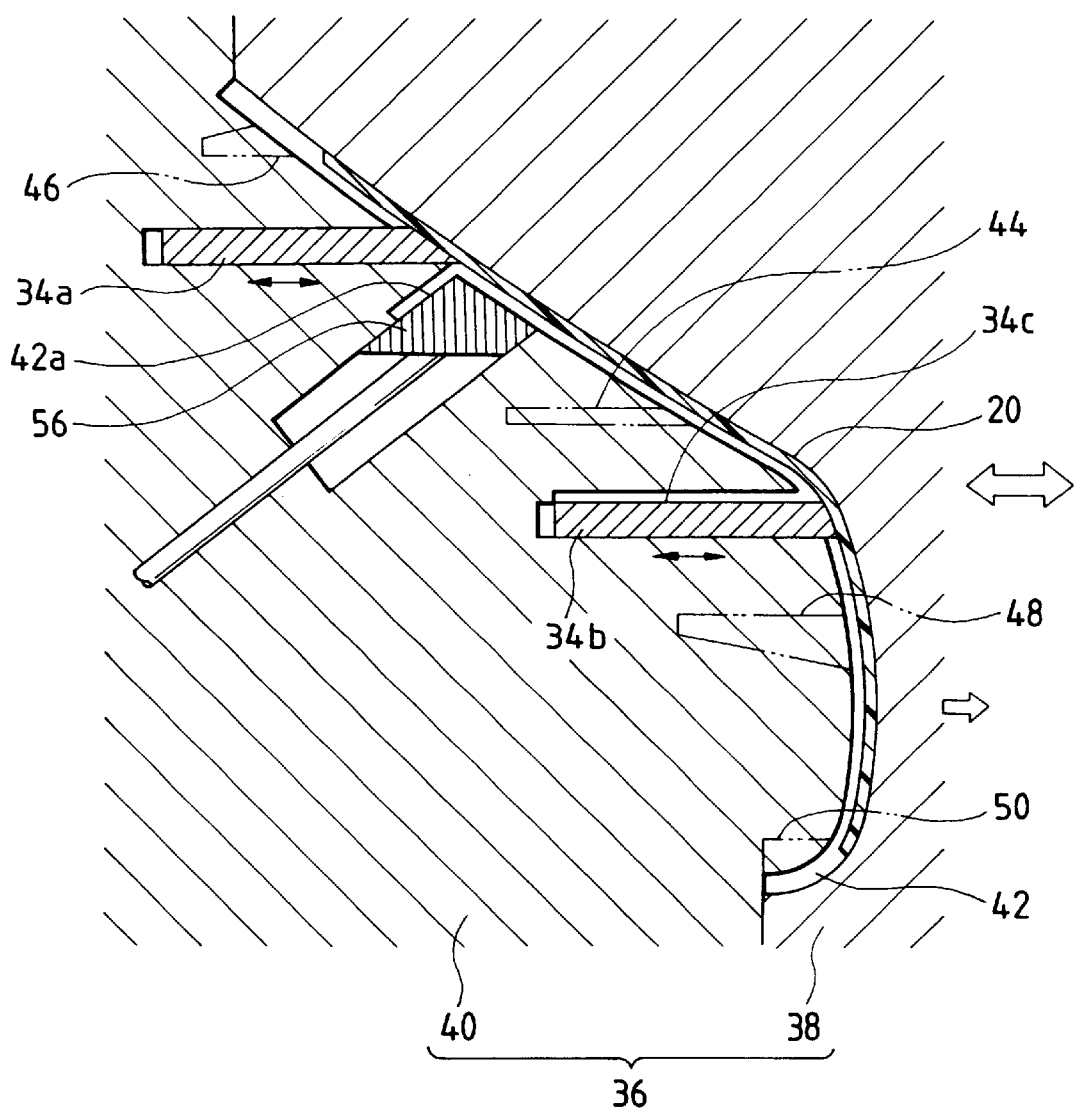
FIG. 6 is a schematic section view of a metal mold, showing a state after it is tightened in a method for manufacturing the instrument panel according to the invention.

(4) Now, description will be given below of a method for manufacturing the above-structured instrument panel 12 (FIG. 6).

(a) The design sheet 20, which has been previously formed into a given shape by vacuum forming, is set in a fixed mold 38 of a metal mold 36 and, after then, the metal mold 36 is tightened. That is, a movable mold 40 is moved in an arrow mark shown in FIG. 6 with respect to the fixed mold 38 to thereby form a cavity 42 and, at the same time, material separating slide cores 34a and 34b are respectively moved forward (shown in FIG. 6).

Here, description will be given of a case in which there are provided slide cores 34a and 34b for separating the forming material of the main body portion 14 and cover portion 16. However, the present slide cores 34a and 34b are not always indispensable and they are substantially different from a slide core which is used to escape from an undercut. In other words, a slide core for separating material is structured so as to move by an amount equivalent to the thickness of the main body portion base material layer 18, that is, the amount of movement thereof is small and is normally uniform over the whole periphery thereof, and the material separating slide core is also formed in a cylindrical-shaped slide core; and, on the other hand, a slide core for undercutting is structured such that the front and rear portions thereof are produced separately from each other and the amount of movement thereof is relatively large because it requires further movement for undercutting.

In the movable mold 40, there are formed a first gate 44 for forming the cover portion as well as second, third and fourth gates 46, 48 and 50 respectively for forming the main body portion. Also, to the inside of a shape forming cavity 42a for forming the front mounting wall 24a, there is assembled a mold releasing slide core 56 by which a molding (that is, a molded product) can be released from the fixed mold 36. Also, out of the material separating slide cores 34a and 34b, on the rear-side slide core 34b, there is provided a projecting strip 34c which, in the retreated state of the slide core 34b, can be used to form (mold) the integral hinge portion 25 in the rear mounting wall 24b.

(b) First thermoplastic resin material (TPE) is charged through the first gate 44 into the product (molding) cavity 42 formed in the metal mold 36 to thereby form the cover portion 16 by injection molding and, slightly after then (for example, in 30 seconds after then), second thermoplastic resin material (reinforcing-filler containing olefin-system resin) thermally fusible with the first thermoplastic resin material is charged into the cavity 42 through the second, third and fourth gates 46, 48 and 50 to thereby form the main body portion 14 by injection molding.

(c) Just before completion of the injection molding of the main body portion 14, the material separating slide cores 34a and 34b are respectively retreated. At the then time, since the main body portion 14 and cover portion 16 are both unhardened and are thereby thermally fused together into an integrally united body and, at the same time, the strip groove 25a is formed in the rear mounting wall 24 by the projecting strip 34c of the rear-side material separating slide core 34b to thereby form the integral hinge portion 25.

(d) After the main body portion 14 is hardened, the thus obtained molding is released from the metal mold. This releasing operation is carried out in such a manner that the mold releasing slide core 56 is retreated up to a position where it does not interfere with the rear mounting wall 24b. To release the molding, simply the single mold releasing slide core 56 may be operated, which makes it possible to simplify the structure and operation of the metal mold.

After the molding is released from the metal mold, the gate portions thereof are removed.

And, by pressing or by similar means, in the respective mounting walls 24a, 24b and 24c, there are formed a plurality of first, second and third engaging holes 28, 30 and 32, respectively.

(4) The thus manufactured instrument panel 12 is then mounted in a car in the following manner, while the cover portion 16 thereof is situated upwardly of the air bag device 58. The air bag device 58 is structured such that an air bag module, which is composed of an air bag 62, an inflator 64 and a diffuser 66, is secured through the flange portion 66a of the diffuser 66 to the inside of an air bag case 60 having an open upper surface.

And, the air bag device 58 is mounted through the air bag case 60 onto a reinforcing bracket 70 fixed to a reinforcing pipe 68 which is disposed on the car body side.

By the way, on the respective support wall portions 60a, 60b and 60c of the upper receive portion of the air bag case 60, there are respectively disposed first, second and third engaging pawls 72, 74 and 76 in such a manner that they are respectively able to support their associated mounting walls 24a, 24b and 24c; and, on the respective support wall portions 60a and 60b, there are disposed first and second receive pieces 78 and 80, thereby providing a partially double structure.

In this manner, the front mounting wall 24a is forcibly fitted along the inside of the support wall portion 60a of the air bag case 60, and the rear mounting wall 24b is forcibly fitted along the outside of the support wall portion 60b of the air bag case 60. Then the first, second and third engaging pawls 72, 74 and 76 are respectively engaged with the first, second and third engaging holes 28, 30 and 32 to thereby be able to hold the neighboring portion of the cover portion of the instrument panel 12 on the car body. The remaining portions of the instrument panel 12 can be held by screwing them to a mounting bracket (not shown) or the like which is disposed on the car body side.

By the way, when mounting the instrument panel 12 onto the car, preselected instruments and the like are disposed on the instrument panel 12.

And, as the need arises, if gas is discharged from the inflator 64, then the gas flows through a diffuser 66 gas flow hole into the air bag 62. In response to this, the air bag 62 breaks the breaking fragile portion B to thereby open or rotate the door portion 22 about the hinge portion H, so that the air bag 62 can be inflated greatly. In this operation, since the front end edges of the reinforcing ribs 26 are arranged in parallel to the front mounting wall 24a, there is no fear that the air bag 62 can flow into between the rear mounting wall 24b and the back surface of the cover portion 16, thereby allowing the air bag to be inflated in a desired manner.

In the present embodiment, the description has been given heretofore of the instrument panel. However, this description is not limitative. For example, the present invention can also apply to other car interior parts such as a door trim seatback which is disposed so as to cover the air bag of the air bag device.

Although the invention has been described in its preferred form with a certain degree of particularity, it is understood that the present disclosure of the preferred form can be arrangement of parts without departing from the spirit and the scope of the invention as hereinafter claimed.

What is claimed is:

1. A car interior part comprising:
   a main body portion;
   a cover portion formed in said main body portion to thereby cover an air bag device, the cover portion including a door portion and a door hinge portion for opening or rotating the door portion; and
   a mounting wall integrally formed with the cover portion and formed in at least a part of a periphery of a back surface of said cover portion, to which the air bag device is coupled,
   wherein a mold releasing direction of said main body portion is set in a direction to cross a developing direction of an air bag of the air bag device, and said mounting wall includes a front mounting wall and a rear mounting wall, at least one of said front and rear mounting walls extends in the same direction as the mold releasing direction of said main body portion and has an integral hinge portion situated at a position upward of a mounting portion to which the air bag device is fixed while one of said front and rear mounting walls is folded at said integral hinge portion, and said door hinge portion being separately formed, and said mounting portion of the mounting wall extends in the developing direction of the air bag, and
   wherein said rear mounting wall includes said integral hinge portion, and the car interior part further includes a plurality of reinforcing ribs, said plurality of reinforcing ribs being disposed in parallel to the mold releasing direction of said main body portion, and said integral hinge portion being formed and folded at a terminal end portion of said plurality of reinforcing ribs that are formed on the opposite side of the main body portion in such a manner as to be in parallel to the developing direction of the air bag.

2. A car interior part according to claim 1, wherein said main body portion and said cover portion are integrally molded.

3. A car interior part according to claim 1, wherein a front end edge of each of said reinforcing ribs extends from the position of said integral hinge portion in parallel to said front mounting wall.

4. A car interior part according to claim 1, wherein respective sides of said main body portion and said cover portion are substantially flush with each other.

5. A car interior part according to claim 1, wherein the door hinge portion is situated on one side of the front and rear sides and the integral hinge portion is situated on another side of said front and rear sides.

* * * * *